(12) United States Patent
Milman et al.

(10) Patent No.: US 8,819,820 B2
(45) Date of Patent: *Aug. 26, 2014

(54) SECURITY CAPABILITY REFERENCE MODEL FOR GOAL-BASED GAP ANALYSIS

(71) Applicant: International Business Machines Corporation, Armonk, NY (US)

(72) Inventors: Ivan Matthew Milman, Austin, TX (US); Martin Oberhofer, Boeblingen (DE); Sushain Pandit, Austin, TX (US); Calvin Stacy Powers, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,896

(22) Filed: Nov. 19, 2012

(65) Prior Publication Data

US 2014/0143878 A1    May 22, 2014

(51) Int. Cl.
*G06F 21/00* (2013.01)
*G06F 21/57* (2013.01)
*H04L 29/06* (2006.01)

(52) U.S. Cl.
CPC .......... *G06F 21/577* (2013.01); *H04L 63/1433* (2013.01)
USPC ............................... 726/22; 726/25; 713/156

(58) Field of Classification Search
None
See application file for complete search history.

(56) References Cited

U.S. PATENT DOCUMENTS

| | | | |
|---|---|---|---|
| 6,484,261 B1 | 11/2002 | Wiegel | |
| 6,779,120 B1 | 8/2004 | Valente et al. | |
| 7,797,737 B2 | 9/2010 | Eibach et al. | |
| 7,882,539 B2 | 2/2011 | Paramasivam et al. | |
| 8,032,939 B2 * | 10/2011 | Palnitkar et al. | 726/25 |
| 8,549,628 B2 * | 10/2013 | Vasireddy et al. | 726/22 |
| 8,549,650 B2 * | 10/2013 | Hanson | 726/25 |
| 2011/0252479 A1 * | 10/2011 | Beresnevichiene et al. | 726/25 |
| 2012/0096435 A1 | 4/2012 | Manolescu et al. | |
| 2013/0275593 A1 * | 10/2013 | Tseitlin et al. | 709/226 |

OTHER PUBLICATIONS

CODEPLEX; "Security Policy Assertion Language"; retrieved on Sep. 12, 2012 from http://secpal.codeplex.com/, Sep. 26, 2009.
IBM; "Updating the WSSR Tivoli CCMDB configuration in the governance enablement profile"; retrieved on Sep. 12, 2012 from http://publib.boulder.ibm.com/infocenter/sr/v7r0/topic/com.ibm.sr.doc/tw, Sep. 3, 2012.
IBM; "Introducing the IBM Security Framework and IBM Security Blueprint to Realize Business-Driven Security" published Dec. 2010 from www.ibm.com/redbooks.

(Continued)

*Primary Examiner* — Gilberto Barron, Jr.
*Assistant Examiner* — Wayne An
(74) *Attorney, Agent, or Firm* — Robert H. Frantz; Jeff S. LaBaw

(57) ABSTRACT

Gap analysis is performed on security capabilities of a computer system compared to a desired or targeted security model according to one or more security requirement by providing a data structure of security capabilities of a computer system under analysis, wherein each capability is classified in a formal security capability reference model with a mean having a set of attributes and a goal; determining the security capabilities of the deployed system-under-analysis; matching the security capabilities of the deployed system-under-analysis with the security capabilities defined in the data structure; determining one or more gaps in security capabilities between the deployed system and a security reference model goal; and displaying the gaps to a user in a report.

24 Claims, 8 Drawing Sheets

(56) References Cited

OTHER PUBLICATIONS

IBM; "Updated:Web Services Security Policy Language", retrieved on Sep. 12, 2012 from http://www.ibm.com/developerworks/library/specification/ws-secpol/, Dec. 18, 2002.

IBM; "WSRR and Tivoli CCMDB Configuration"; retrieved on Sep. 12, 2012 from http://publib.boulder.ibm.com/infocenter/sr/v7r0/topic/com.ibm.sr.doc/c, Sep. 3, 2012.

Ip.com; "Method for Security Policy Deployment and Heterogeneous Network and End-Point Devices Using an Integrated Data Model and Capability Knowledge" published on May 14, 2003 from www.ip.com.

Lane; "Sequence Matching and Learning in Anomaly Detection for Computer Science" retrieved from Purdue University, 1997.

UMBC; "Rei: A Policy Specification Language"; retrieved on Sep. 12, 2012 from http://rei.umbc.edu/.

FOLDOC; definition of "data structure", retrieved on Oct. 26, 2012 from http://www.foldoc.org/data+structure, Sep. 11, 2003.

What-Is; definition of "data structure", retrieved on Oct. 26, 2012 from http://searchsqlserver.techtarget.com/definition/data-structure.

IBM; applicant's reply to first office action in Related U.S. Appl. No. 13/740,553, filed Jan. 14, 2013 by Ivan Matthew Milman.

USPTO; Examination Correspondence from a Related U.S. Appl. No. 13/740,553, filed Jan. 14, 2013 by Ivan Matthew Milman.

\* cited by examiner

SECURITY CAPABILITY REFERENCE MODEL FOR GOAL-BASED GAP ANALYSIS

FIELD OF THE INVENTION

This invention generally relates to technologies for effective use of system security capabilities, and for detecting and correcting gaps between security policy and deployment realities.

BACKGROUND OF INVENTION

Government regulations and industry standards drive security requirements in computing system environments for the protection of the resources and information they store. Unauthorized use of the resources, such as transmission and store-and-forward capabilities, can aid in illegal and malevolent activities, with loss of potential revenue to the equipment owner. Unauthorized access to data stored by the computing systems can lead to identity theft, fraud, and even loss of physical security of high-stakes facilities such as nuclear power plants, government buildings, chemical processing operations, etc.

Today, there are many regulations and standards with which businesses and other entities need to comply. For example:

(a) United States Title 21, Code of Federal Regulations (CFR), section 11 for the U.S. Food and Drug Administration (FDA) outlines how pharmaceutical manufacturers submit electronic records to the FDA. A key aspect of the electronic record is an affixed digital signature.

(b) The German Bundesdatenschutzgesetz, or "Federal Data Protection Act" demands strong controls from enterprises regarding how to collect, process and release personally identifiable information (PII). It particularly outlines protection requirements (access control and encryption).

(c) The United Kingdom's Data Protection Act of 1984, among other things, requires that PII is not propagated or transmitted outside European Union (EU) boundaries unless the owner has explicitly agreed to that.

(d) U.S. Health Insurance Portability and Accountability Act of 1996 (HIPAA) and Health Information Technology for Economic and Clinical Health Act (HITECH) mandates some specific usage of encryption for storing private personal health information (PHI).

Regulations and laws such as these examples drive requirements in the areas of authorization, authentication, audit, encryption, etc., for owners and operators of certain computing enterprises. In addition to regulations, there are also business requirements, corporate policies, and from standardization bodies recommendations driving—increased demand for security capabilities in computing systems, such as secure firewalls to protect the network infrastructure or data masking requirements to protect sensitive information during application testing in development cycles.

SUMMARY OF EXEMPLARY EMBODIMENTS OF THE INVENTION

Gap analysis is performed on security capabilities of a computer system compared to a desired or targeted security model according to one or more security requirement by accessing a data structure in computer memory of security capabilities of a computer system under analysis, wherein each capability is classified in a formal security capability reference model with a mean having a set of attributes and a goal; determining the security capabilities of the deployed system-under-analysis; matching the security capabilities of the deployed system-under-analysis with the security capabilities defined in the data structure; determining one or more gaps in security capabilities between the deployed system and a security reference model goal; and displaying the gaps to a user in a report.

BRIEF DESCRIPTION OF THE DRAWINGS

The description set forth herein is illustrated by the several drawings.

DETAILED DESCRIPTION OF EXEMPLARY EMBODIMENT(S) OF THE INVENTION

Figure 1:
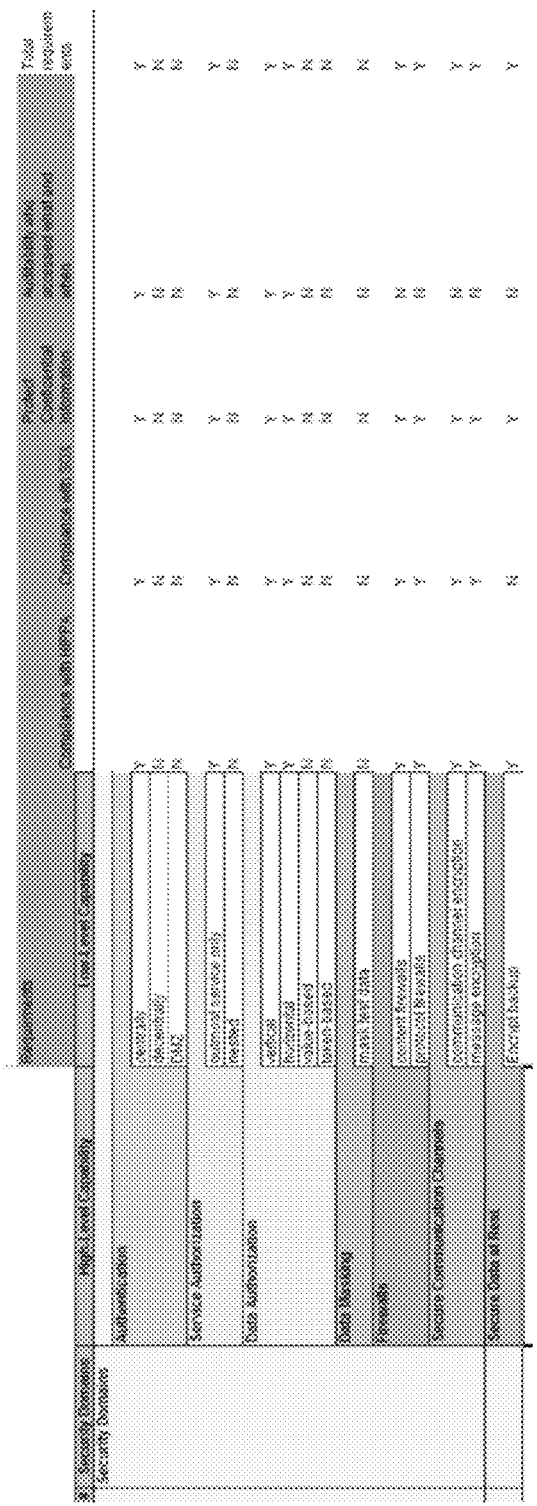
FIG. 1 provides an informal visualization of a security capability reference model according to the present invention.

The inventors of the present and the related invention have recognized problems not yet recognized by those skilled in the relevant arts regarding gaps between security policy, computing system security capabilities, and the actual security implementations of a particular computing enterprise.

Bearing in mind the regulatory and standards-driven security requirements as discussed in the Background section of this disclosure, the present inventors further consider the following realities of current state-of-the art computing systems.

First, there are many existing software capabilities addressing the security requirements to one degree or another. The currently available security capabilities addressing these requirements are available according to different technologies such as:

(a) firewalls;

(b) Lightweight Directory Access Protocol (LDAP) technologies (e.g., Tivoli Directory Server™, Apache DS™, etc.);

(c) encryption technologies and protocols (e.g., True-Crypt™, secure sockets layer (SSL), etc.); and (d) Data Masking (e.g., IBM's Optim Test Data Management™).

Second, there are available tools for software discovery and management of Information Technology (IT) asset infrastructure that a company or organization has currently deployed. Another aspect of these tools is the ability for managing the physical infrastructure of an enterprise. This type of tool is able to collect operational metadata by:

(a) detecting installed hardware and its types (server, network device, etc.);

(b) detecting operating systems and their patch level;

(c) detecting Internet Protocol (IP) addresses and hostnames within a network;

(d) detecting software running on these systems (e.g., IBM's WebSphere Application Server™, etc.); and (e) maintaining this information over time.

Third, there are available tools for a solution architect to design a new computing solution, also referred to briefly as "solution", which also might have security requirements, such as IBM's InfoSphere Blueprint Director™. These design tools generally offer a range of capabilities, including but not limited to:

(a) providing guidance as to what a legislation means in technical terms from a security requirement perspective; and (b) providing guidance using prescriptive approaches on solution design what are the security requirements for MDM, BI, etc. solutions.

The present inventors found the following issues and opportunities for improving the performance of computing system security capabilities with the existing state of the art tools and components, many of which exist with a variety of the competing tools and platforms on the market today:

(a) there is a need for a tool mapping security requirements of a computing solution against security capabilities;

(b) there is a need for a tool mapping security requirements of a solution against available security capabilities on the installed system the company already has in operation, in order to achieve:
1. security gap analysis; and
2. a suggestion on how to close these gaps considering cost, skills required, implementation timeline, and business risk assessment (e.g., is it cheaper to deploy the security solution or to pay the fine in case the non-compliance is detected and punished?); and (c) there is a need for data and information linkage between architecture solution design tools-which brings the solution metadata together with the infrastructure metadata.

For example, IBM's WebSphere Service Registry and Repository (WSRR)™ can utilize certain metadata from the Tivoli CCMDB system as is publicly disclosed in the manner described in "WSRR and Tivoli CCMDB Configuration" and in "Updating the WSRR Tivoli CCMDB configuration in the governance enablement profile", both published by IBM Boulder, and both of which are incorporated by reference herein.

Overview and Terminology

A match between an entry in a configuration management tool and a Service Registry and Repository tool is possible by using hostname/IP address as matching criteria because both of tools have this information stored according to at least one embodiment. It is not that straightforward to link components of a solution design or "blueprint" to computing assets managed by a configuration management database.

This issue makes it very difficult, extremely time consuming and error-prone to advise a customer what, if any, additional security features must be implemented for a new solution. Weeks of effort may be require for something as simple as responding to a Request for Proposal (RFP) to address a use case and solution in the area of personally identifiable information in an information-centric solutions.

Embodiments of the present invention use a data structure, such as a catalog, of security capabilities where each capability is classified in a formal security capability reference model with a Mean and a Goal. An example entry in such a model includes a "mean" of "Digital Signature" and a "goal" of "auditability".

To model the capabilities on a more detailed level, the concept of a Domain can be used for a Mean providing a set of attributes which can be used to further describe the Mean. For example, for the Mean=encryption, the Domain can include the following choices: {one-way hash function, homomorphic encryption, AES, 3DES, etc.}

Each security requirement in an implementation requires an activity to be done using a capability. For example, an activity to achieve compliance in an auditable way might be using mean=digital signatures. So for each capability in the security capability reference model, the system will define an activity as further characteristic.

For the purpose of the present disclosure, the exact degree of the security capability reference model is not crucial. It can be as sophisticated as International Standards Organization (ISO) 27001, or it may be something less complex, wherein the key aspect of it is that it is a formalized representation of security capabilities.

A very simple, and thus informal, visualization of this is provided in FIG. 1. On the vertical axis, the various security capabilities are listed, and on the horizontal axis the various use cases are listed. After establishing behind the User Interface (UI) the reference model according to the present invention, the system is then enabled in a straightforward way to accumulate requirements across multiple use cases which are illustrated in the right-hand column indicating whether or not a capability is required across all use cases. The accumulation of the requirements is the classification computed as outlined in the following paragraphs regarding the Requirements Classification Process.

Figure 2:
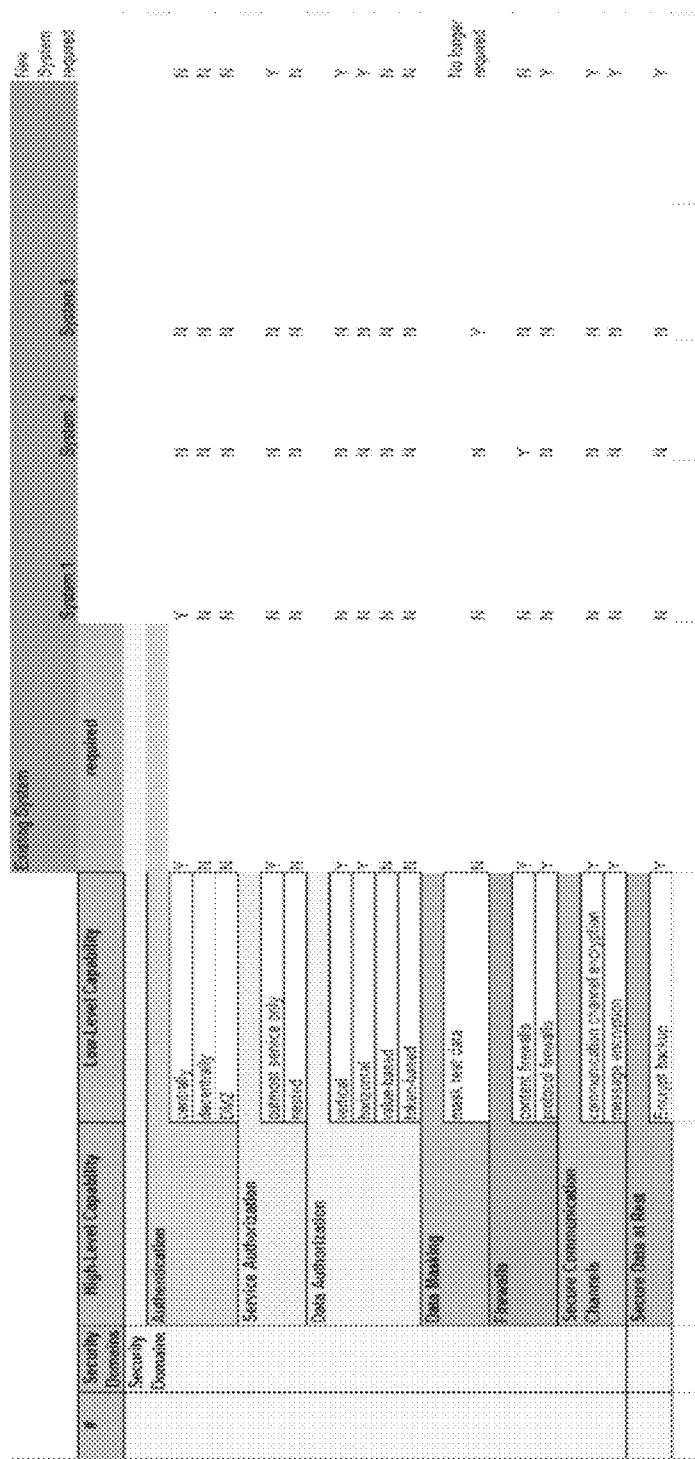
FIG. 2 illustrates a security capability reference model according to the present invention.

The deployment topology of systems providing security capabilities is also correlated with the security capability reference model as illustrated in FIG. 2. Again, vertically shown are the security capabilities and horizontally shown are the existing deployed systems such as firewalls, LDAP directories, etc. Now with the classification computed in the previous step, the Gap Analysis Process, as described in the following paragraphs, is enabled to determine which additional security capabilities need to be implemented. In order to implement these two processes, there is a need for a solution design tool (e.g., IBM InfoSphere Blueprint Director™ or a similar architectural system design tool) and a system topology tool (e.g., Tivoli CCMDB)™ or a similar configuration control management tool), to be integrated on a metadata layer as previously described.

Finally, once the embodiment of the invention has determined any gaps regarding the security capabilities, the Security Implementation Advisor Process, as described in further detail in the following paragraphs, is performed to advise an administrator on how to best address them.

Some benefits of embodiments of the present invention include providing a prescriptive approach to determine whether or not additional security features have to be implemented reducing errors reduced time to determine security capability gaps simplified, and enabling consistent management of security infrastructure reduced cost (e.g., avoiding to deploy redundant security systems from 2 different vendors for the same task).

Example Embodiment and Logical Processes.

In one exemplary embodiment, we assume for the implementation a solution design tool such as IBM InfoSphere Blueprint Director™ (or similar) is available, that a tool is used to manage the configuration and deployment topology of the IT department of an enterprise, such as Tivoli Change and Configuration Management Database (CCMDB)™ or similar. And, we further assume that and integration between them has been configured so that the metadata in CCMDB can be accessed by the solution design tool.

Once the blueprint is complete, a button (or other user control) on the user interface of the solution design tool can be used to trigger the security advisor process of the present invention, thereby allowing to the solution design tool to show the user the required security capabilities (output of the Requirements Classification Process), how they correlate with existing the system's available security features in the IT landscape (output of the Gap Analysis Process), and in case there are detected gaps, how to address them (output of Security Implementation Advisor Process).

For this exemplary implementation, a first step is to establish a security capability reference model. The security capability reference model comprises a data structure containing all different types of security features by category, such as the Examples show in Table 1.

TABLE 1

Example Categories of Security Features

| Category | Capability |
| --- | --- |
| Firewalls | protocol firewall, content firewall |
| Data authorization | vertical filtering, horizontal filtering, value-based, token-based |

For each capability in the security capability reference model, there is at least a tuple defined as {Activity, Mean, Domain, Goal}, as shown in Table 2.

TABLE 2

Security Capability Reference Model Tuples

| Reference Model Item | Definition or Description of the Item |
| --- | --- |
| "Activity" | A task to be done to address a security requirement. |
| "Mean" | The mechanism or method for how the key feature of the implementation of the capability is provided within the solution. |
| "Domain" | This further details the mean by providing a list of attributes further characterizing the Mean, for example in case the mean is encryption, the domain could contain attributes such as one-way hash functions, homomorphic encryption function, DES, AES, etc. Domains can also be used to qualify operating system requirements, etc. if the capabilities are fine-granular enough. |
| "Goal" | The desired outcome of using the mean for the activity. |

Please note that this is just one available formalization of the security capability reference model per the invention, as there are different formalizations available depending on specific implementation.

Federation System.

Figure 4A:
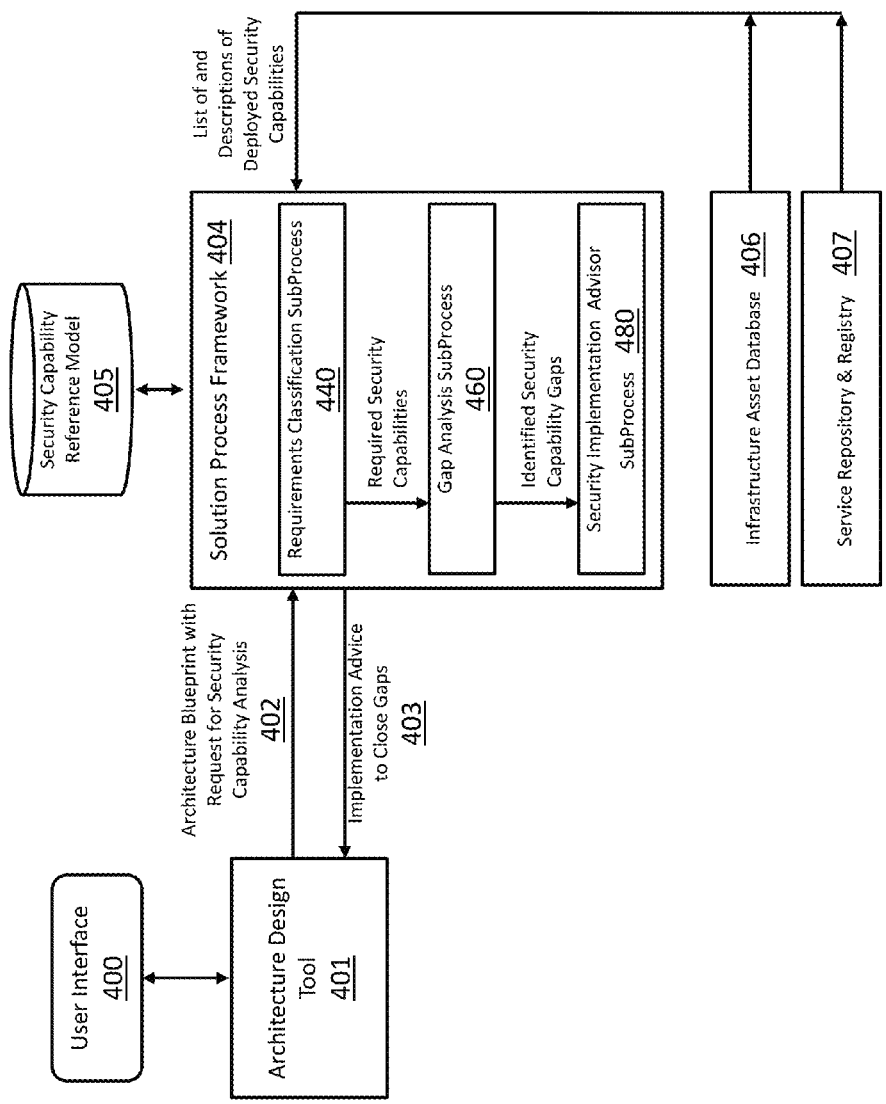
FIG. 4a shows an exemplary federation model of a configuration management database and a web service registry and repository suitable for realization of the invention, coupled with logical processes such as those exemplified in FIGS. 4b-4d.

One available configuration of components to yield an embodiment according to the present invention is to create a federation model, such as by using the Tivoli CCMDB federation model with WSRR-CCMDB integration, as shown in FIG. 4a. The following paragraphs provide a high-level description of the interactions and cooperation between the various subsystems, components, subcomponents, processes and subprocesses within such an embodiment.

Via a User Interface (400) to a computer and an architecture design tool (401), such as IBM Blueprint Director™ or similar, a user designs a solution architecture and requests security capability analysis for that new solution architecture. This request for security capability analysis triggers execution of the security analysis sub-processes (440, 460, and 480) of the solution process framework (404), which are discussed in more detail relative to FIGS. 4b-4d. The solution process framework returns implementation advice (403) to close any identified security gaps to the user via the User Interface (400) through the design tool (401).

Some embodiments may utilize Tivoli CCMDB™ or a similar configuration management database which contains the relevant metadata on systems such as firewalls, routers and switches, OS, storage devices, application servers, databases, the version of these systems, departments, lifecycle status, etc. In addition, there is also information about the department, the users, etc. for the systems available. Finally, with the relationships stored within the CCMDB information on the topology is available allowing to determine proximity, etc. There are multiple possibilities how the Gap Analysis Algorithm can process this metadata on the deployed systems:

The framework (404) receives the security capability reference model (405), which is consumed by the requirements classification subprocess (440). The gap analysis subprocess (460) consumes infrastructure information on deployed assets and services/software from an infrastructure asset database (406), such as the aforementioned Tivoli CCMDB, and from a service repository and registry (407), such as the aforementioned WSRR. In some embodiments, the infrastructure asset database and the service repository and registry may be integrated with each other. The consumed infrastructure information contains identification of the deployed security capabilities, including which capabilities are being utilized and their settings, and which capabilities are deployed but not currently utilized.

Before moving to the detailed discussion of the subprocesses (440, 460, 470), it is useful to note:
  (a) The system components of the embodiment according to the invention may be on the same or different hardware platforms.
  (b) The Solution Process Framework (404) may be a single component embedded within the Architecture Design Tool (401), or it may be a stand-alone tool separate from an Architectural Design Tool, and it may yet as well be one component per subprocess in which subprocess APIs would be consumed by the Architecture Design Tool. For embodiments in which the framework (404) is a stand-alone tool, the requirements classification process may be provided as a service offering for use with architecture designs expressed in a known common notation, such as the well-known Unified Method Framework (UMF) for The Open Group Architecture Framework (TOGAF).

The Infrastructure Asset Database and the Service Repository and Registry are two examples, of course, and there can be more in an Information Technology (IT) infrastructure which may be integrated into or interfaced to the Solution Process Framework (404).

Requirements Classification SubProcess.

Figure 4B:
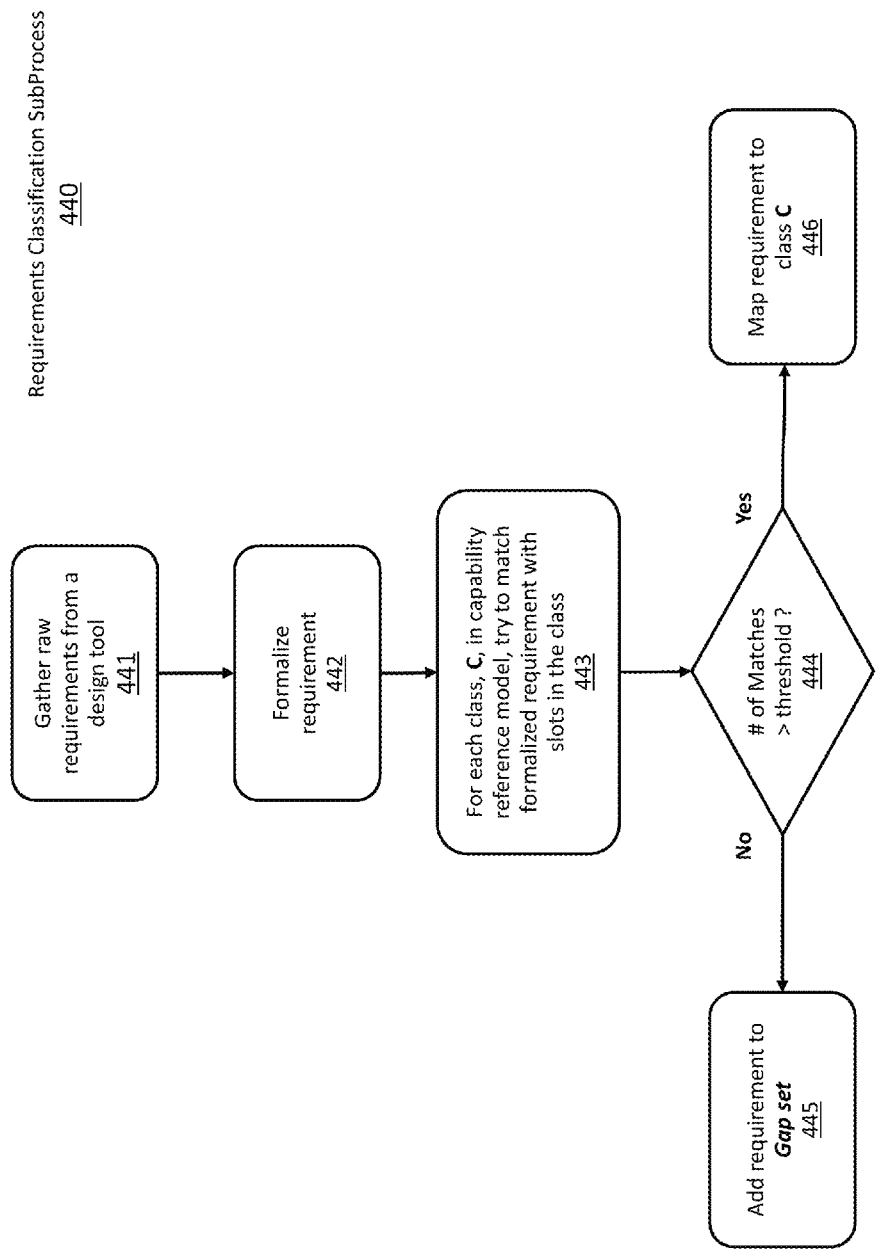

Referring now to FIG. 4b, an exemplary logical process for the Requirements Classification SubProcess (440) is shown and discussed. Based upon a set of raw security requirements which are input to or otherwise received (441) by the process, a suitable set of systems is found by:
  1. Using a solution design tool (e.g., the aforementioned Blueprint Director™ or similar) to transform (442) the raw security requirements into formal (technical) specs, which are possibly incomplete. For example:
    a. There may be a raw requirement stating that a pharmaceutical manufacturer who needs to submit electronic records to the U.S. Food and Drug Administration (FDA) which must comply with FDA requirements on electronic record reporting to clear-off their audit criteria.

b. Further, a template within a solution design tool might contain a solution architecture defining best practices for a FDA-approved project. This solution landscape could have a compliance requirement that a digital signature be affixed to each record before passing it on to the FDA to clear-off their audit.

c. The requirement may then be formalized into a computer readable record using keywords from descriptive text in the requirement using our security capability reference model as follows:

```
R1: {  Activity: Compliance,
       Means: Digital_signature,
       Domain: asymmetric_key_algorithm_using_probabilistic_
              _seed_in_key,
       Goal: Audit}
```

2. The embodiment then uses a predefined security capability reference model containing different classification templates, and it maps these possibly incomplete or non-exhaustive requirements onto the model to deduce a minimal set of high-level, abstract classifications that is subsuming all of the formalized requirements identified above. This step is important because:

a. In deducing the formal requirements from the raw specifications, it cannot be guaranteed that there is no information loss. It is quite possible that part of the actual requirement is lost in this transformation. This step ensures that by mapping this formalized requirement to a standard security capability reference model, the system works in terms of standard generalizations.

b. As will be shown later, this step allows the system to deduce relevant infrastructure metadata and in turn identify the systems offering the capabilities that would satisfy the requirements.

Figure 3:
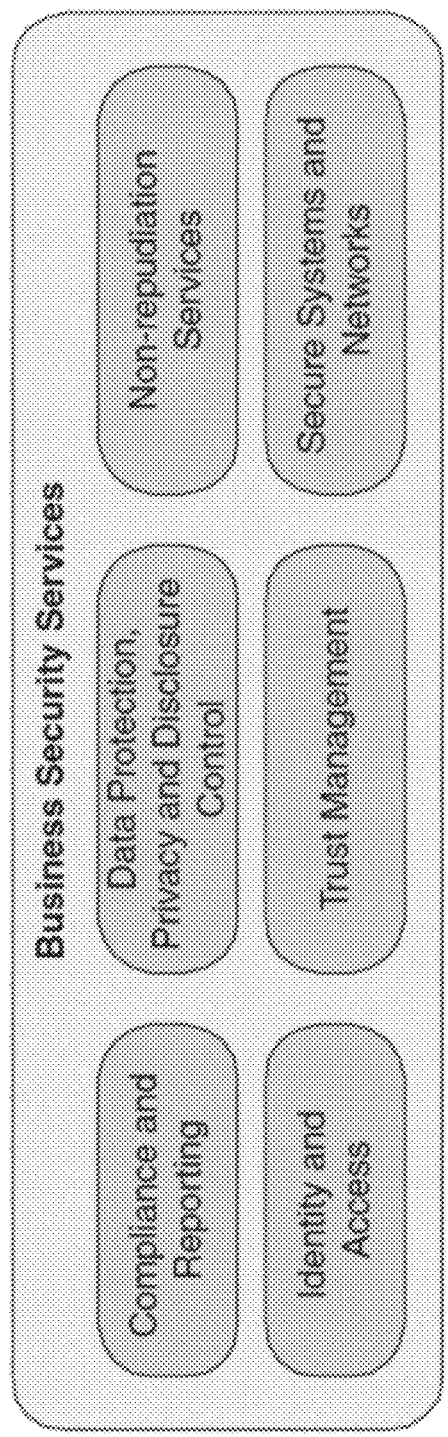
FIG. 3 depicts some realized Security Capability Reference Model classification schemas according to the present invention.

3. Continuing with the previous example to understand this step, for instance, the security capability reference model might define a classification scheme, as shown in FIG. 3, which is stored in one or more computer readable data storage memory device(s). Further, for the purposes of this example, assume that the Compliance and Reporting classification template (slot and filler structure) is defined as follows:

Slot1: Measure; Possible fillers: {Business Performance metric, IT Performance metric, Enterprise Performance metric, statistics regarding age of cryptographic keys, statistics regarding age of passwords, percentage of data protected by each level of encryption, number of failed access attempts, etc.}

Slot2: Reporting; Possible fillers: {Audit Information, Breach reports, thwarted attack reports, administrative reports with warnings and/or error log, resolution of problem reports, etc.}

Slot3: Compliance: Possible fillers: {Correctness, Consistency, Service Compliance, Severity, Scope, etc.}

4. Next, the mapping from formal requirement R1 to the reference model is performed by finding suitable fillers for corresponding slots of different classifications. The embodiment can use a simple process such as the following, or more complex variants. For a classification C (443), if the number of matching slots meets or exceeds a threshold (444), then the requirements are mapped (646) to the class C (threshold can be 1 or higher). In this example, slots are matched primarily to Activities or alternatively to Goals., e.g., Slot2 and Slot3 above would be matched "Audit" and "Compliance", respectively, because these can be possible fillers for them. As a result, the system will have a match of two slots and thus, Compliance and Reporting will be the designated classification for this requirement.

In addition to the primary matching described above, an embodiment can provide further fine-granular matching based on the "Domain" description captured in the formalized requirement. For instance, there could be an additional slot describing certain domain-specific features of the classification template (e.g., a capability that is required only on a specific type of operating system, or an asymmetric key algorithm that must be probabilistic (non-deterministic) in nature), with corresponding fillers. In such a scenario, the matching algorithm might be able find a tighter match (more number of matching slots) or reject a match (on grounds of domain-mismatch) by considering the "Domain" in addition to the other attributes (Activity, Goal, etc) captured in the formalized requirement.

All the requirements that cannot be mapped to a classification template are captured (445) in a set called Gap_Set_Requirements representing the gap between requirements and the capabilities.

Gap Analysis SubProcess.

Figure 4C:
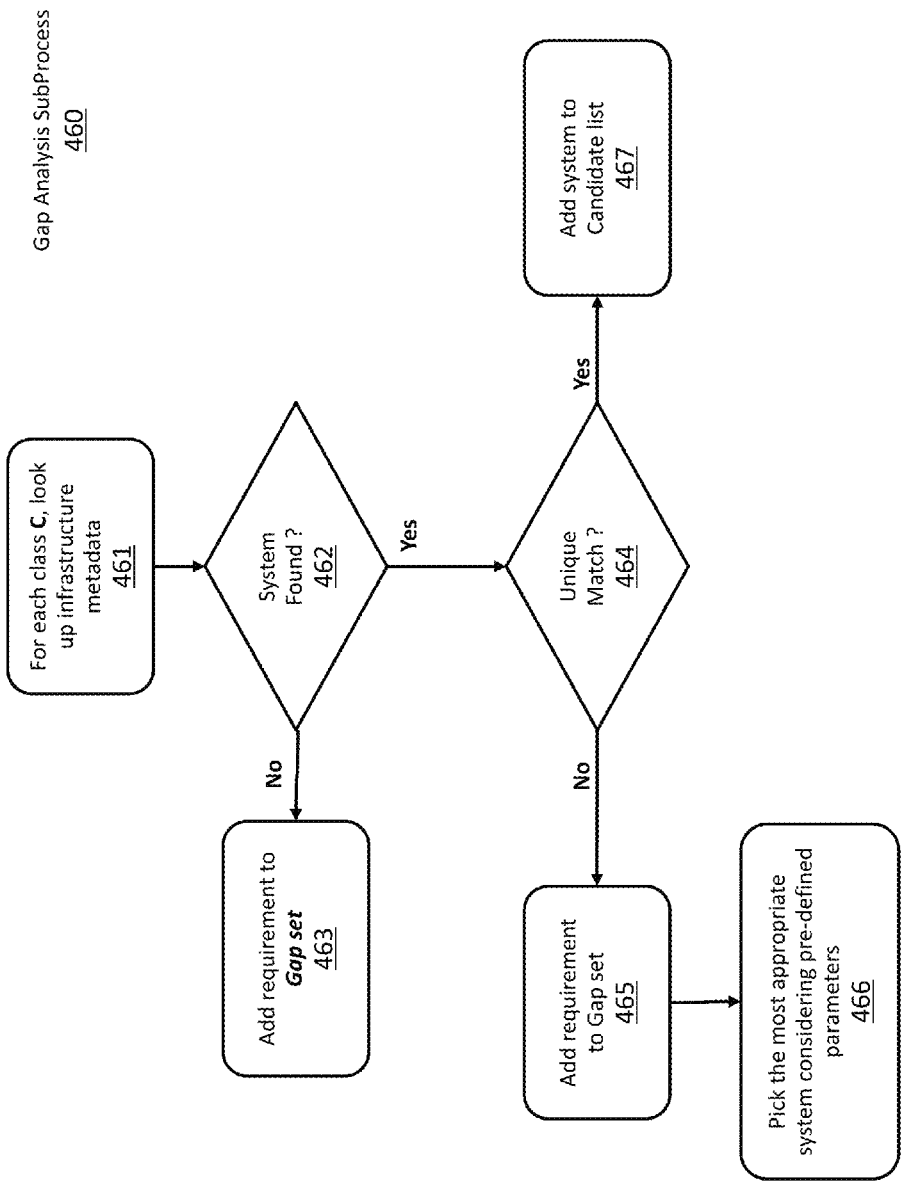
Figure 4D:
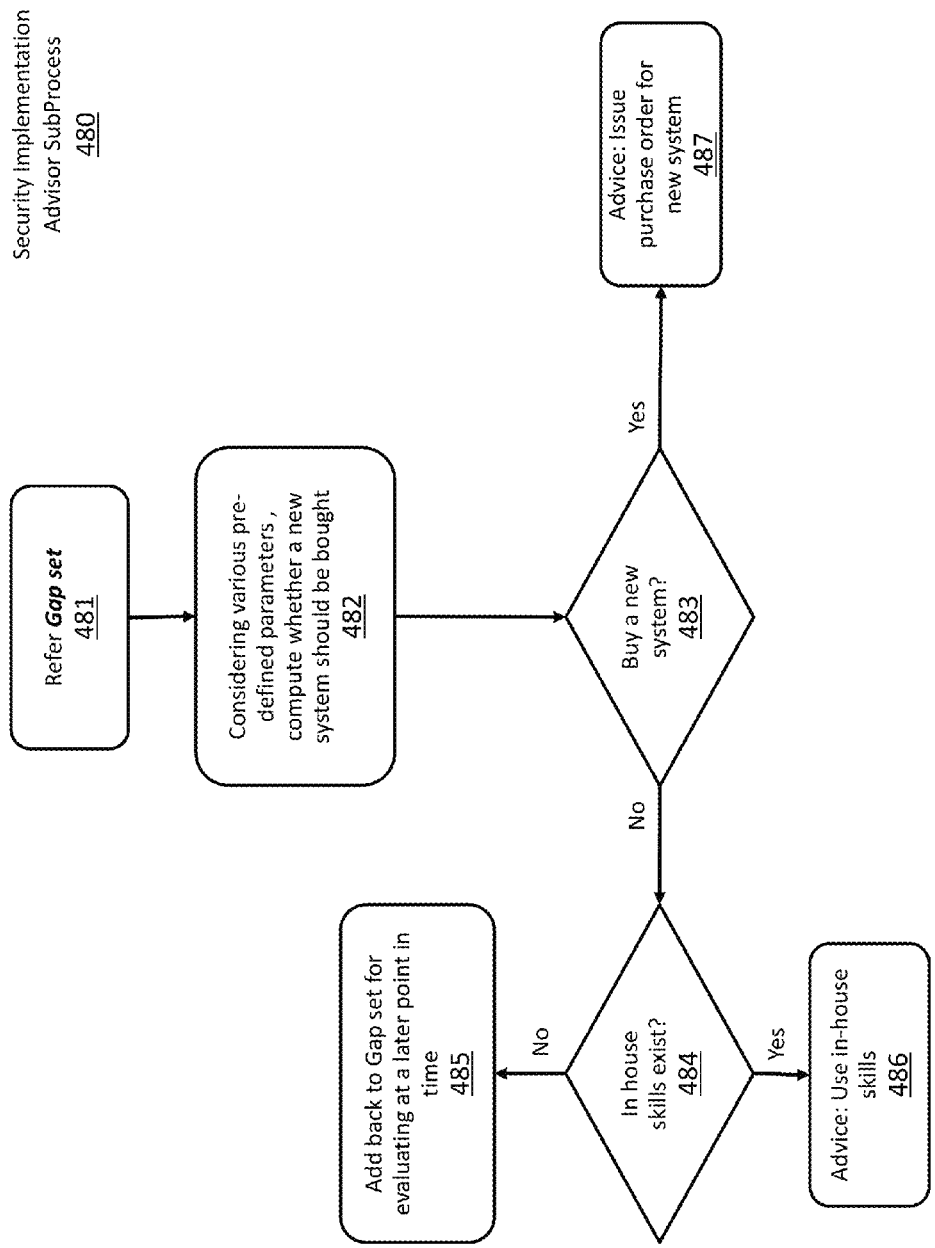

Following the completion of the Requirements Classification Process (440), an embodiment will perform Gap Analysis by determining utilization levels of available used, available unused, and unavailable security resources and capabilities and comparing those utilization levels to the security model goal, such as the exemplary logical process (460) shown in FIG. 4c and described as follows:

1. Establish or "draw" a mapping from the set of classification templates which matched one or multiple requirements, as described in the foregoing paragraphs, to a configuration management tool, such as Tivoli CCMDB (or similar), to determine using a set of infrastructure metadata (in turn the corresponding systems) offering capabilities satisfying these requirements.

For an example embodiment utilizing a CCMDB, the CCMDB product contains the relevant metadata on systems such as firewalls, routers and switches, OS, storage devices, application servers, databases, the version of these systems, departments, lifecycle status, etc. In addition, there is also information about the department, the users, etc. for the systems available. Finally, with the relationships stored within the CCMDB information on the topology is available allowing to determine proximity, etc. There are multiple possibilities how the Gap Analysis SubProcess (460) can process this metadata on the deployed systems:

a. One available process is to create a federation model similar to the Tivoli CCMDB federation model as shown in the WSRR-CCMDB integration, as previously discussed with reference to FIG. 4a. In this case a portion of the relevant Tivoli CCMDB metadata would be federated into an Architecture Design Tool such that the security capability reference model and the classification templates can be mapped to corresponding Tivoli CCMDB metadata.

b. Another available process would be to query the CCMDB directly with an appropriate Application Programming Interface (API).

2. Next, the logical process will determine for the set of classification templates related to the requirements a set of systems corresponding to the infrastructure metadata (hosts, etc.), satisfying the capabilities for the set of requirements. For each capability in a classification template marked to be correlated with a requirement (461), there is exactly one outcome of the following three possibilities possible:

a. If no match was found (462), then the capability is added (463) to the set of Gap_Set_Infrastructure.
b. If just one unique match is found (464), then the system is added (467) to the candidate result system list.
c. Otherwise, multiple matches have been found (e.g., there is more than one system found for a requirement), so the requirement is added (465) to the Gap_Set, and the most appropriate system is picked (466) considering characteristics such as, but not exhaustively, cost associated with internal contract, proximity, availability, and system ownership by department. The details on this selection may vary according to implementation and preferences a user might be setting which means there is possibly a weighted average across some or all of these characteristics may be also advantageous.

The determination process can be implemented with queries, for example, such as the queries to get all computer systems providing firewall capabilities on Linux™ OS:

```
SELECT * FROM ComputerSystem
    WHERE
        OSRunning.OSName == 'Linux'
    AND
        DEVICE_TYPE='Firewall'.
```

Such queries are dynamically constructed based on the capabilities marked in a classification template as matching a requirement.

All the systems in the candidate result system list are eventually shown to the user via the User Interface of the design tool (UI), where they may be highlighted icons in the solution design depiction. Optionally, the user may be given a choice, such as a pop-up menu, to decline adding the security capability to the Gap_Set_Infrastructure or to accept the proposed system as part of the solution.

Also, the user is presented via the User Interface the total Gap_Set_Infrastructure for verification. Any mismatch perceived as determined by the user can optionally be resolved by user actions, such as dragging and dropping a capability from this set onto an icon in the solution design depiction indicating that this component provides the capability. In at least one embodiment of the present invention, such a user-taken corrective action automatically results in updates the metadata in the CCMDB, thereby improving it for future automated operation.

Security Implementation Advisor SubProcess.

Responsive to completion of the Requirements Classification SubProcess (440) and the Gap Analysis SubProcess (460), an embodiment of the invention will access and refer (481) to the Gap_Set_Requirements and the Gap_Set_Infrastructure to decide whether to recommend buying a new system (or system component) satisfying the requirements in this set based on the following exemplary logical process (480). Input can be provided interactively at the beginning or through database-storing previously entered information), may include some or all of:

1. approximate cost range for non-compliance with a security requirement if detected and fines or fees levied;
2. approximate cost of Software and Hardware Cost for a system addressing one or multiple requirements from the Gap_Set_Requirements and Gap_Set_Infrastructure;
3. availability of in-house skills for implementation, and if none are available, approximate costs for services; and
4. estimated timeline for implementation of the changes or upgrades.

Based on these input parameters and the preferences associated with them (e.g., non-compliance is an option, an option up to a maximum limit, etc.) which are reflected as weights, the process then computes (482) for each missing capability a recommendation on whether or not (483, 487) a new system(s) should be purchased. If in-house skills exist (484) to address each required security capability, that advice (486) may also be reported to the user. If not, then the requirement may be returned (485) to the Gap_set_requirements for future consideration.

Suitable Computing Platform.

The preceding paragraphs have set forth example logical processes according to the present invention, which, when coupled with computing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 5:
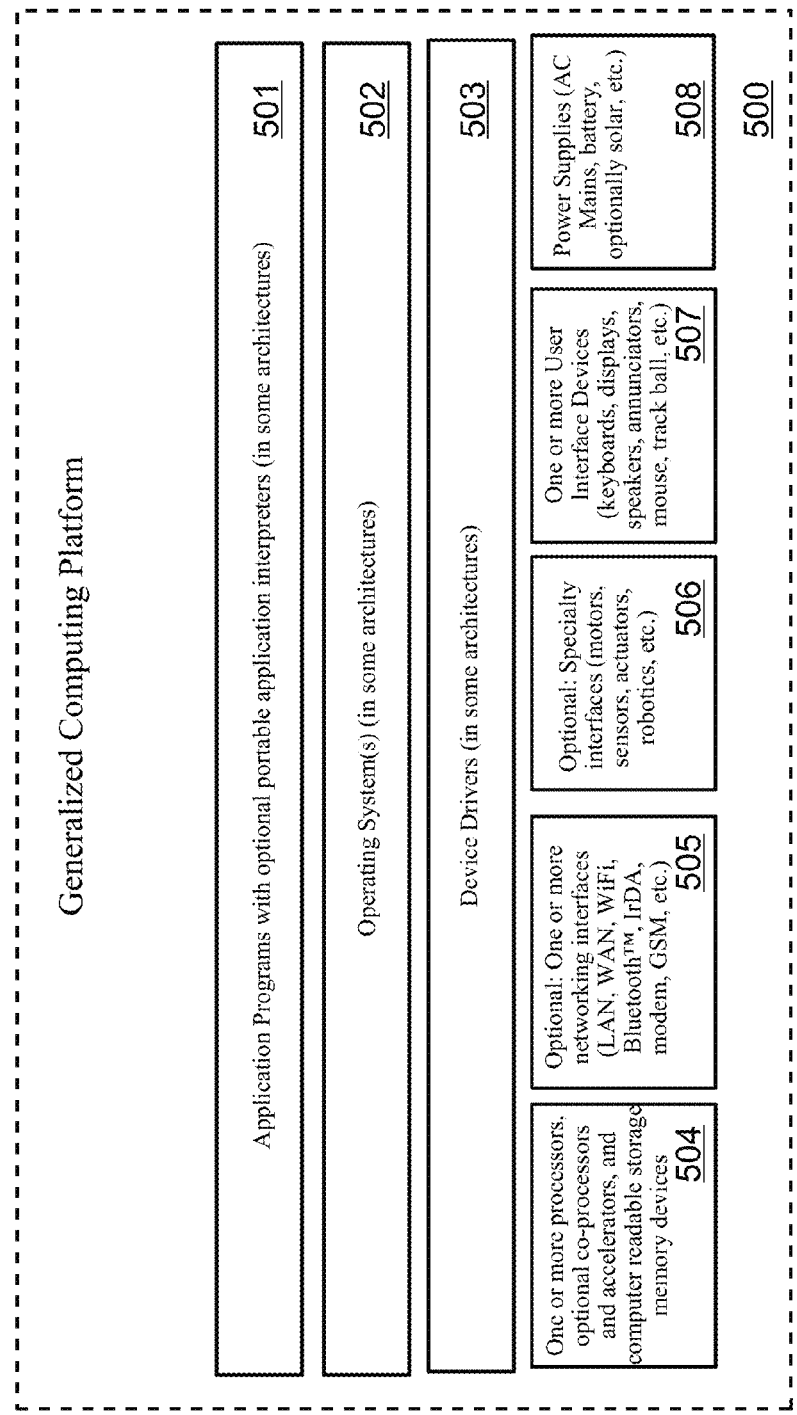
FIG. 5 sets forth a generalized architecture of computing platforms suitable for at least one embodiment of the present and the related inventions.

The present invention may be realized for many different processors used in many different computing platforms. FIG. 5 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, Palm OS™, Microsoft Windows Mobile™, UNIX, LINUX, Google Android™, Apple iPhone iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A computer program product for matching and performing gap analysis of security capabilities of a computer system comprising:
   at least one computer readable storage memory device;
   a security capability reference model data structure containing indications of available security capabilities of a computer system under analysis, wherein each capability is classified in a formal security capability reference model with a mean having a set of attributes and a goal;
   first program instructions for determining by a processor utilization levels of security capabilities of the computer system under analysis in a currently deployed state;
   second program instructions for matching by a processor the utilization levels with the available security capabilities defined in the data structure;
   third program instructions for determining by a processor one or more gaps between the utilization levels and a corresponding security reference model goal, wherein each gap corresponds to an unmatched utilization level with an available security capability;
   fourth program instructions for performing by a processor a correction analysis to determine one or more potential corrective actions; and
   fifth program instructions for producing by a processor a report of the gaps, and wherein each reported gap corresponds to at least one available security capability of the system under analysis which is available but used, available and unused, or unavailable, and wherein the report includes the one or more potential corrective actions to correct the identified one or more gaps;
   wherein the security capability reference model data structure, and the first, second, third, and fourth program instructions are stored in or on the at least one computer readable storage memory device.

2. The computer program product as set forth in claim 1 wherein the security reference model goal comprises security requirements which comply with at least one requirement selected from the group consisting of a statutory requirement, a regulatory requirement, a standardization body recommendation, a corporate policy and a client policy.

3. The computer program product as set forth in claim 1 wherein the security capability reference model data structure comprises a plurality of type indicators of security features by category and by capabilities within the category.

4. The computer program product as set forth in claim 3 wherein one or more categories and capabilities are selected from the group consisting of a firewall category with a protocol capability, a firewall category with a content capability, a data authorization category with a vertical filtering capability, a data authorization category with a horizontal filtering capability, a data authorization category with a value-based capability, and a data authorization category with a token-based capability.

5. The computer program product as set forth in claim 3 wherein, for each capability in the security capability reference model data structure, there is defined at least a tuple selected from the group consisting of an activity, a mean, a domain, and a goal, wherein an activity contains one or more tasks to be done to address a security requirement, wherein a mean contains one or more methods or mechanism for providing a feature of the implementation of the capability, wherein a domain contains one or more details associated with a mean including a list of attributes further characterizing the mean, and wherein a goal contains one or more target outcomes of using the mean for the activity.

6. The computer program product as set forth in claim 1 further comprising fifth program instructions for, responsive to finding no matching capability for a requirement, recommending in the report adding a capability to the computing system under analysis, responsive to finding one match between a capability and a requirement, recommending in the report designating the capability as a candidate capability to engage, and responsive to finding multiple matches, selecting one or more best candidates for recommending in the report to engage, wherein the fifth program instructions are stored in or on the at least one computer readable storage memory device.

7. The computer program product as set forth in claim 6 wherein the selecting one or more best candidates comprises selecting one or more capabilities according to one or more criteria selected from the group consisting of a cost associated with an internal contract, proximity of the capability, availability of the capability, system ownership by a department or organization of the capability.

8. The computer program product as set forth in claim 6 wherein each of the criteria are assigned a weight for determining a final recommendation.

9. A system for matching and performing gap analysis of security capabilities of a computer system comprising:
   a computer readable storage memory device storing or encoding a reference model data structure of available security capabilities of a computer system under analysis, wherein each capability is classified in a formal security capability reference model with a mean having a set of attributes and a goal; and
   a computing hardware component for performing a logical process comprising:
      determining utilization levels of the security capabilities of a computer system under analysis in a currently deployed state;
      matching the utilization levels with the available security capabilities defined in the data structure;
      determining one or more gaps between the utilization levels and a corresponding security reference model goal, wherein each gap corresponds to an unmatched utilization level with an available security capability;
      performing a correction analysis to determine one or more potential corrective actions; and
      producing a report indicating of the gaps, and wherein each reported gap corresponds to at least one available security capability of the system under analysis which is available but used, available and unused, or unavailable, and wherein the report includes the one or more potential corrective actions to correct the identified one or more gaps.

10. The system as set forth in claim 9 wherein the security reference model goal comprises security requirements which comply with at least one requirement selected from the group consisting of a statutory requirement, a regulatory requirement, a standardization body recommendation, a corporate policy and a client policy.

11. The system as set forth in claim 9 wherein the security capability reference model data structure comprises a plurality of type indicators of security features by category and by capabilities within the category.

12. The system as set forth in claim 11 wherein one or more categories and capabilities are selected from the group consisting of a firewall category with a protocol capability, a firewall category with a content capability, a data authorization category with a vertical filtering capability, a data authorization category with a horizontal filtering capability, a data authorization category with a value-based capability, and a data authorization category with a token-based capability.

13. The system as set forth in claim 11 wherein, for each capability in the security capability reference model data structure, there is defined at least a tuple selected from the group consisting of an activity, a mean, a domain, and a goal, wherein an activity contains one or more tasks to be done to address a security requirement, wherein a mean contains one or more methods or mechanism for providing a feature of the implementation of the capability, wherein a domain contains one or more details associated with a mean including a list of attributes further characterizing the mean, and wherein a goal contains one or more target outcomes of using the mean for the activity.

14. The system as set forth in claim 9 wherein the computing hardware component for performing matching and determining of one or more gaps is further for, subsequent to finding no matching capability for a requirement, recommending in the report adding a capability to the computing system under analysis, subsequent to finding one match between a capability and a requirement, recommending in the report designating the capability as a candidate capability to engage, and subsequent to finding multiple matches, selecting one or more best candidates for recommending in the report to engage.

15. The system as set forth in claim 14 wherein the computing hardware component for selecting one or more best candidates is for selecting one or more capabilities according to one or more criteria selected from the group consisting of a cost associated with an internal contract, proximity of the capability, availability of the capability, system ownership by a department or organization of the capability.

16. The computer program product as set forth in claim 14 wherein each of the criteria are assigned a weight for determining a final recommendation.

17. A method for matching and performing gap analysis of security capabilities of a computer system comprising the steps of:
   accessing by a processor a security capability reference model data structure containing indications of available security capabilities of a computer system under analysis, wherein each capability is classified in a formal security capability reference model with a mean having a set of attributes and a goal;
   determining by a processor utilization levels of security capabilities of the computer system under analysis in a currently deployed state;
   matching by a processor the utilization levels with the available security capabilities defined in the data structure;
   determining by a processor one or more gaps between the utilization levels and a corresponding security reference model goal, wherein each gap corresponds to an unmatched utilization level with an available security capability;
   performing by a processor a correction analysis to determine one or more potential corrective actions; and
   producing by a processor a report of the gaps, and wherein each reported gap corresponds to at least one available security capability of the system under analysis which is available but used, available and unused, or unavailable, and wherein the report includes the one or more potential corrective actions to correct the identified one or more gaps.

18. The method as set forth in claim 17 wherein the security reference model goal comprises security requirements which comply with at least one requirement selected from the group consisting of a statutory requirement, a regulatory requirement, a standardization body recommendation, a corporate policy and a client policy.

19. The method as set forth in claim 17 wherein the security capability reference model data structure comprises a plurality of type indicators of security features by category and by capabilities within the category.

20. The method as set forth in claim 19 wherein one or more categories and capabilities are selected from the group consisting of a firewall category with a protocol capability, a firewall category with a content capability, a data authorization category with a vertical filtering capability, a data authorization category with a horizontal filtering capability, a data authorization category with a value-based capability, and a data authorization category with a token-based capability.

21. The method as set forth in claim 19 wherein, for each capability in the security capability reference model data structure, there is defined at least a tuple selected from the group consisting of an activity, a mean, a domain, and a goal, wherein an activity contains one or more tasks to be done to address a security requirement, wherein a mean contains one or more methods or mechanism for providing a feature of the implementation of the capability, wherein a domain contains one or more details associated with a mean including a list of attributes further characterizing the mean, and wherein a goal contains one or more target outcomes of using the mean for the activity.

22. The computer program product as set forth in claim 17 further comprising, responsive to finding no matching capability for a requirement, producing by the processor a recommendation in the report for adding a capability to the computing system under analysis, responsive to finding one match between a capability and a requirement, recommending in the report designating the capability as a candidate capability to engage, and responsive to finding multiple matches, selecting one or more best candidates for recommending in the report to engage, wherein the fifth program instructions are stored in or on the at least one computer readable storage memory device.

23. The method as set forth in claim 22 wherein the selecting one or more best candidates comprises selecting one or more capabilities according to one or more criteria selected from the group consisting of a cost associated with an internal contract, proximity of the capability, availability of the capability, system ownership by a department or organization of the capability.

24. The method as set forth in claim 22 wherein each of the criteria are assigned a weight for determining a final recommendation.

\* \* \* \* \*